United States Patent [19]

Arai

[11] 4,262,240
[45] Apr. 14, 1981

[54] STEPPING MOTOR APPARATUS COMPRISING ELECTRICAL DETENT MEANS

[75] Inventor: Shigeyuki Arai, Tokyo, Japan

[73] Assignee: Ricoh Company, Ltd., Tokyo, Japan

[21] Appl. No.: 14,590

[22] Filed: Feb. 23, 1979

[30] Foreign Application Priority Data

Mar. 2, 1978 [JP] Japan .................................. 53-23950

[51] Int. Cl.³ .......................................... G05B 19/40
[52] U.S. Cl. ..................................... 318/685; 318/696
[58] Field of Search ................. 318/685, 696, 138, 254

[56] References Cited

U.S. PATENT DOCUMENTS

| 3,573,589 | 4/1971 | Berry | 318/685 |
|---|---|---|---|
| 3,736,488 | 5/1973 | Abraham et al. | 318/696 |
| 3,893,012 | 7/1975 | Lin | 318/696 |
| 4,035,708 | 7/1977 | Schaff | 318/696 |

Primary Examiner—J. V. Truhe
Assistant Examiner—Eugene S. Indyk
Attorney, Agent, or Firm—David G. Alexander

[57] ABSTRACT

The phases of a multi-phase stepping motor (16) are individually energized to rotate the motor shaft (14) to a desired step position. A sensor (12), (27) driven by the shaft (14) is constructed to generate a plurality of position signals (L1), (L2), (L3) equal in number to the motor phases. The position signals (L1), (L2), (L3) are symmetrical and are displaced in phase from each other by the angle (15°) between adjacent shaft steps. These signals (L1), (L2), (L3) are decoded to energize the motor phases in such a manner as to rotate the shaft (14) to a next step during rotation of the shaft (14). A hold decoder (26) decodes the position signals (L1), (12), (13) to energize the motor phases in such a manner as to hold the shaft (14) at the desired step when rotation of the shaft (14) is stopped. If the shaft (14) is manually rotated to another shaft position, the hold decoder (26) will energize the motor phases in a different manner so as to hold the shaft (14) at the new step. In this manner, the motor shaft (14) may be manually rotated to and electrically held at any step.

9 Claims, 10 Drawing Figures

STEPPING MOTOR APPARATUS COMPRISING ELECTRICAL DETENT MEANS

BACKGROUND OF THE INVENTION

The present invention relates to an electrical stepping motor apparatus comprising an electrical detent means by which the motor shaft and associated load may be manually rotated to and held at any step position.

Stepping motor systems comprising multi-phase motors are known in the art. A typical application of such a system is for drivably rotating a platen in a printer, facsimile receiver or the like. A photoelectric transducer is connected to the motor shaft and generates a timing pulse each time the shaft is rotated by one step. For electrically rotating the shaft from a present step to a new selected step, the phases of the motor are individually energized in such a manner as to cause the shaft to rotate toward the new step. The pulses are counted and the shaft stopped when the new step is reached. One or more of the phases of the motor are energized in such a manner as to electrically hold the shaft at the new step position.

Although such a stepping motor drive system is generally advantageous and acceptable, a drawback has remained heretofore in that satisfactory means for manually rotating the shaft have not been proposed. Although it is possible to rotate the shaft against the energization of the motor phases to a new equilibrium position, this is not satisfactory since there are only a few equilibrium positions for each combination of energized phases. The angle between the equilibrium positions is equal to the number of motor phases times the angle between step positions. For a three phase motor in which the angle between adjacent steps is 15°, an equilibrium position exists for each 45° of shaft rotation. In other words, although there are 24 steps per revolution of the shaft, there are only 4 equilibrium positions per revolution for each combination of energized motor phases. For this reason, although the shaft may be electrically rotated to and positioned at any step, the shaft may only be manually rotated to and positioned at intervals of three steps. This makes manual rotation of a platen connected to the shaft coarse due to the small number of electrical equilibrium or detent positions.

A prior art expedient to overcome this problem is to provide a clutch between the shaft and the platen which may be disengaged to rotate only the platen. Another expedient is to de-energize the motor when the selected step is reached and engage a mechanical detent mechanism. Yet another expedient is to provide a mechanical vernier mechanism for rotating the platen with the motor temporarily de-energized. Although such prior proposals constitute partially acceptable solutions, each involve the provision of additional mechanical components which add to the cost and complexity of the apparatus and do not constitute a detent means which allows the shaft to be manually rotated precisely to each step position.

SUMMARY OF THE INVENTION

A stepping motor apparatus embodying the present invention includes a multi-phase motor having a shaft and drive means for individually energizing the motor phases to rotate the shaft to a selected one of a predetermined number of equally spaced angular steps. Sensor means driven by the motor shaft generate a plurality of position signals equal in number to a number of the motor phases, the position signals being displaced in phase from each other by an angle between two adjacent steps of the shaft. Hold decoder means decode the position signals and control the drive means to energize at least one of the motor phases in such a manner as to hold the shaft at a present step.

In accordance with the present invention, the phases of a multi-phase stepping motor are individually energized to rotate the motor shaft to a desired step position. A sensor driven by the shaft is constructed to generate a plurality of position signals equal in number to the motor phases. The position signals are symmetrical and are displaced in phase from each other by the angle between adjacent shaft steps. These signals are decoded to energize the motor phases in such a manner as to rotate the shaft to a next step during rotation of the shaft.

A hold decoder decodes the position signals to energize the motor phases in such a manner as to hold the shaft at the desired step when rotation of the shaft is stopped. If the shaft is manually rotated to another shaft position, the hold decoder will energize the motor phases in a different manner so as to hold the shaft at the new step. In this manner, the motor shaft may be manually rotated to and electrically held at any step.

It is an object of the present invention to provide a stepping motor apparatus comprising improved electrical detent means allowing manual rotation to and retention of a motor shaft at any step position.

It is another object of the present invention to provide a stepping motor apparatus having more detent positions and using a mechanically simplified arrangement compared to the prior art.

It is another object of the present invention to provide a generally improved stepping motor apparatus.

Other objects, together with the foregoing, are attained in the embodiments described in the following description and illustrated in the accompanying drawing.

DESCRIPTION OF THE PREFERRED EMBODIMENTS

While the stepping motor apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
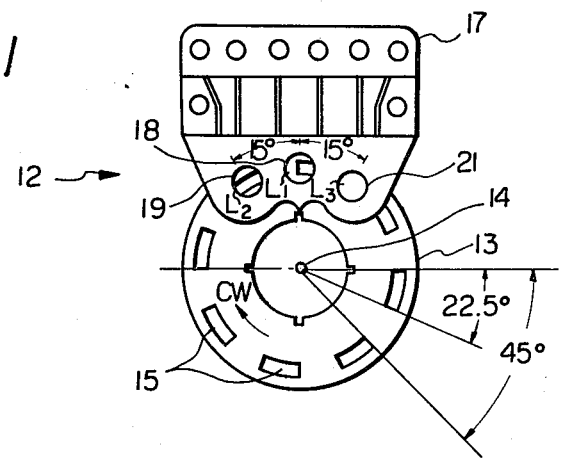
FIG. 1 is a diagram of a photoelectric transducer constituting part of a sensor means embodying the present invention.
Figure 2:
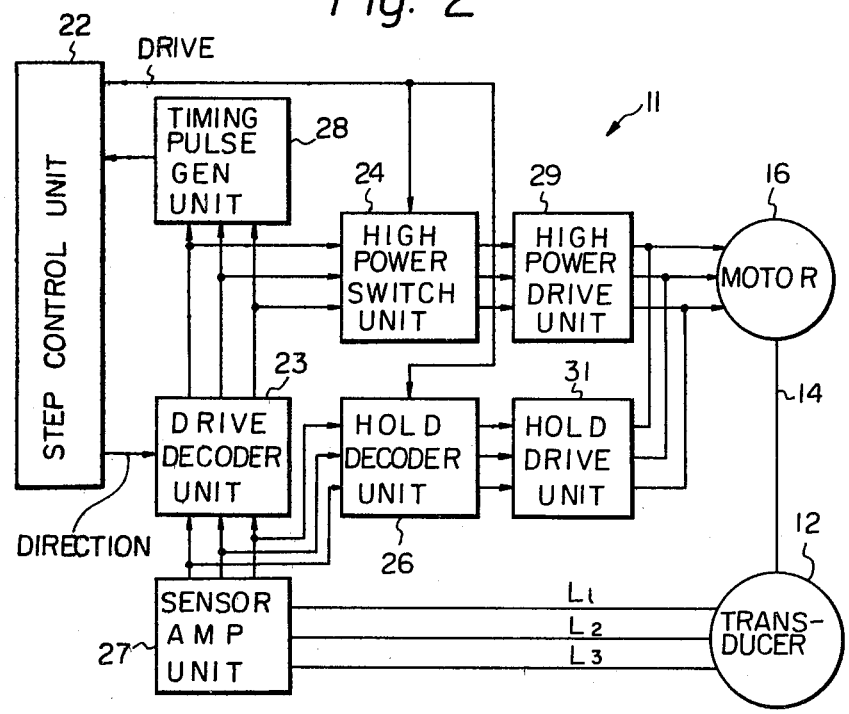
FIG. 2 is a block diagram of a stepping motor apparatus embodying the present invention which comprises a three phase stepping motor.

Referring now to FIG. 1 of the drawing, a stepping motor apparatus embodying the present invention is generally designated by the reference numeral 11 and comprises a photoelectric transducer 12 which is also shown in FIG. 2. The transducer 12 comprises a disc 13 which is rotatably driven by a shaft 14 of a multi-phase stepping motor 16. The disc 13 is divided into eight segments of 45° each. Whereas the body of the disc 13 is opaque, it is provided with transparent slots 15. One slot 15 is provided in each 45° segment with the slot 15 having an angular width of 22.5° and the opaque area constituting the remainder of the segment also having an angular width of 22.5°.

The transducer 12 further comprises a body 17 which is fixed in position relative to the disc 13. Three photosensors 18, 19 and 21 are mounted on the body 17 to generate position signals L1, L2 and L3 respectively. The photosensors 18, 19 and 21 are mounted at angles of 15° relative to each other in the manner illustrated and produce high and low outputs when the slots 15 and opaque areas are adjacent thereto respectively.

The apparatus 11 further comprises a step control unit 22 which feeds a direction signal to a drive decoder unit 23. The step control unit 22 further generates a drive signal which is fed to a high power switch unit 24 and a hold decoder unit 26. The transducer 12 generates the position signals L1, L2 and L3 upon rotation of the shaft 14 and feeds the position signals to a sensor amplifier unit 27. The amplifier unit 27 amplifies the position signals and feeds the same to the drive decoder unit 23 and hold decoder unit 26. Outputs of the drive decoder unit 23 are fed to a timing pulse generator unit 28 which generates and feeds timing pulses to the step control unit 22. Outputs of the high power switch unit 24 are fed to a high power drive unit 29 which generates signals to drive the motor 16. Outputs of the hold decoder unit 26 are fed to a hold drive unit 31 which applies signals to the motor 16 to hold the shaft 14 at a particular step.

Figure 3:
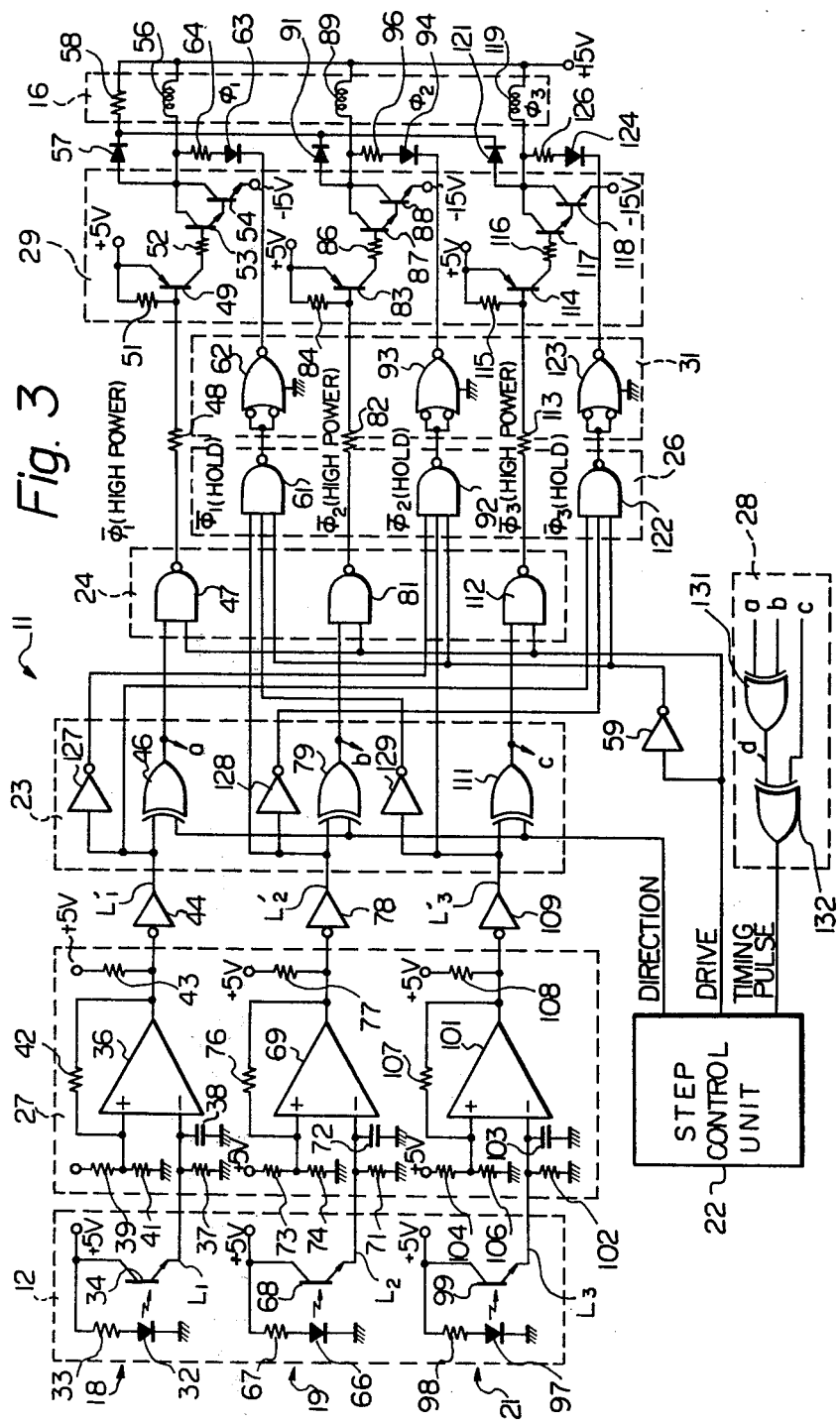
FIG. 3 is a detailed electrical schematic diagram of the apparatus of FIG. 2.

Referring also to FIG. 3, the photosensor 18 comprises a light emitting diode (LED) 32, the cathode of which is connected to ground. The anode of the LED 32 is connected through a resistor 33 to a +5 V supply. The collector of an NPN phototransistor 34 is connected to the +5 V supply, the emitter of the phototransistor 34 being connected to an inverting input of an operational amplifier 36 of the unit 27. A resistor 37 and capacitor 38 are connected in parallel between the inverting input of the operational amplifier 36 and ground.

Fixed bias is applied to the non-inverting input of the operational amplifier 36 by means of a voltage divider consisting of resistors 39 and 41 connected between the +5 V supply and ground. The junction of the resistors 39 and 41 is connected to the non-inverting input of the operational amplifier 36. A feedback resistor 42 is connected between the output and non-inverting input of the operational amplifier 36. A resistor 43 is connected between the output of the operational amplifier 36 and the +5 V supply.

The output of the operational amplifier 36 is connected through an inverter 44 to an input of an exclusive OR gate 46 of the unit 23. The direction signal is applied from the unit 22 to another input of the exclusive OR gate 46. A signal a appears at the output of the exclusive OR gate 46 which is connected to an input of a NAND gate 47 of the unit 24. The drive signal from the unit 22 is applied to another input of the NAND gate 47, the output of which is connected through a resistor 48 to the base of a PNP transistor 49 of the unit 29.

The emitter of the transistor 49 is connected to the +5 V supply. A bias resistor 51 is connected between the emitter and base of the transistor 49. The collector of the transistor 49 is connected through an input resistor 52 to the base of an NPN transistor 53. The emitter of the transistor 53 is connected to the base of an NPN transistor 54, the emitter of which is connected to a −15 V supply. The collectors of the transistors 53 and 54 are connected together to constitute a Darlington amplifier. The collector of the transistor 54 is connected through a phase 1 ($\Phi$1) winding 56 of the motor 16 to a +15 V supply. The collector of the transistor 54 is also connected to the anode of a diode 57, the cathode of which is connected through a resistor 58 to the +15 V supply.

The drive signal from the unit 22 is fed through an inverter 59 to an input of a NAND gate 61 of the unit 26. The output of the NAND gate 61 is fed through a NOR gate 62 of the unit 31 to the cathode of a diode 63. The anode of the diode 63 is connected through a resistor 64 to the collector of the transistor 54. The output of the NAND gate 61 is connected to two inverting inputs of the NOR gate 62 which functions as a driver.

The photosensor 19 comprises a light emitting diode (LED) 66, the cathode of which is connected to ground. The anode of the LED 66 is connected through a resistor 67 to the +5 V supply. The collector of an NPN phototransistor 68 is connected to the +5 V supply, the emitter of the phototransistor 68 being connected to an inverting input of an operational amplifier 69 of the unit 27. A resistor 71 and capacitor 72 are connected in parallel between the inverting input of the operational amplifier 69 and ground.

Fixed bias is applied to the non-inverting input of the operational amplifier 69 by means of a voltage divider consisting of resistors 73 and 74 connected between the +5 V supply and ground. The junction of the resistors 73 and 74 is connected to the non-inverting input of the operational amplifier 69. A feedback resistor 76 is connected between the output and non-inverting input of the operational amplifier 69. A resistor 77 is connected between the output of the operational amplifier 69 and the +5 V supply.

The output of the operational amplifier 69 is connected through an inverter 78 to an input of an exclusive OR gate 79 of the unit 23. The direction signal is applied from the unit 22 to another input of the exclusive OR gate 79. A signal b appears at the output of the exclusive OR gate 79 which is connected to an input of a NAND gate 81 of the unit 24. The drive signal from the unit 22 is applied to another input of the NAND gate 81, the output of which is connected through a resistor 82 to the base of a PNP transistor 83 of the unit 29.

The emitter of the transistor 83 is connected to the +5 V supply. A bias resistor 84 is connected between the emitter and base of the transistor 83. The collector of the transistor 83 is connected through an input resistor 86 to the base of an NPN transistor 87. The emitter of the transistor 87 is connected to the base of an NPN transistor 88, the emitter of which is connected to the −15 V supply. The collectors of the transistors 87 and 88 are connected together to constitute a Darlington amplifier. The collector of the transistor 88 is connected through a phase 2 ($\Phi 2$) winding 89 of the motor 16 to the +15 V supply. The collector of the transistor 88 is also connected to the anode of a diode 91, the cathode of which is connected through the resistor 58 to the +15 V supply.

The drive signal from the unit 22 is fed through the inverter 59 to an input of a NAND gate 92 of the unit 26. The output of the NAND gate 92 is fed through a NOR gate 93 of the unit 31 to the cathode of a diode 94. The anode of the diode 94 is connected through a resistor 96 to the collector of the transistor 88. The output of the NAND gate 92 is connected to two inverting inputs of the NOR gate 93 which functions as a driver.

The photosensor 21 comprises a light emitting diode (LED) 97, the cathode of which is connected to ground. The anode of the LED 97 is connected through a resistor 98 to the +5 V supply. The collector of an NPN phototransistor 99 is connected to the +5 V supply, the emitter of the phototransistor 99 being connected to an inverting input of an operational amplifier 101 of the unit 27. A resistor 102 and capacitor 103 are connected in parallel between the inverting input of the operational amplifier 101 and ground.

Fixed bias is applied to the non-inverting input of the operational amplifier 101 by means of a voltage divider consisting of resistors 104 and 106 connected between the +5 V supply and ground. The junction of the resistors 104 and 106 is connected to the non-inverting input of the operational amplifier 101. A feedback resistor 107 is connected between the output and non-inverting input of the operational amplifier 101. A resistor 108 is connected between the output of the operational amplifier 101 and the +5 V supply.

The output of the operational amplifier 101 is connected through an inverter 109 to an input of an exclusive OR gate 111 of the unit 23. The direction signal is applied from the unit 22 to another input of the exclusive OR gate 111. A signal c appears at the output of the exclusive OR gate 111 which is connected to an input of a NAND gate 112 of the unit 24. The drive signal from the unit 22 is applied to another input of the NAND gate 112, the output of which is connected through a resistor 113 to the base of a PNP transistor 114 of the unit 29.

The emitter of the transistor 114 is connected to the +5 V supply. A bias resistor 115 is connected between the emitter and base of the transistor 114. The collector of the transistor 114 is connected through an input resistor 116 to the base of an NPN transistor 117. The emitter of the transistor 117 is connected to the base of an NPN transistor 118, the emitter of which is connected to the −15 V supply. The collectors of the transistors 117 and 118 are connected together to constitute a Darlington amplifier. The collector of the transistor 118 is connected through a phase 3 ($\Phi 3$) winding 119 of the motor 16 to the +15 V supply. The collector of the transistor 118 is also connected to the anode of a diode 121, the cathode of which is connected through the resistor 58 to the +15 V supply.

The drive signal from the unit 22 is fed through the inverter 59 to an input of a NAND gate 122 of the unit 26. The output of the NAND gate 122 is fed through a NOR gate 123 of the unit 31 to the cathode of a diode 124. The anode of the diode 124 is connected through a resistor 126 to the collector of the transistor 118. The output of the NAND gate 122 is connected to two inverting inputs of the NOR gate 123 which functions as a driver.

The output of the inverter 44 is connected directly to an input of the NAND gate 122 and is further connected through an inverter 127 to an input of the NAND gate 92. The output of the inverter 78 is connected directly to an input of the NAND gate 61 and through an inverter 128 to an input of the NAND gate 122. The output of the inverter 109 is connected directly to an input of the NAND gate 92 and through an inverter 129 to an input of the NAND gate 61.

The signals a and b which appear at the outputs of the exclusive OR gates 46 and 79 are connected to respective inputs of an exclusive OR gate 131 of the unit 28. The output of the exclusive OR gate 131 constituting a signal d is connected to an input of another exclusive OR gate 132. The signal c which appears at the output of the exclusive OR gate 111 is applied to another input of the exclusive OR gate 132. The timing pulses which are produced at the output of the exclusive OR gate 132 are fed to the step control unit 22.

The transducer 12 is of the type disclosed in Japanese patent application no. 49-65183 (publication no. 51-4518) in which the proportion of transparent slot areas of the disc 13 is given as 3:[(3×number of motor phases)−3]. The angular width of each segment is equal to the number of phases of the motor times the angular width between adjacent steps. In the present example the motor 16 is assumed to be a three phase motor and the angle between adjacent steps is equal to 15°. The width of each segment is 45° and the proportion of transparent areas is 1:2. Therefore, each transparent slot 15 of the disc 13 has a width of 22.5° and each opaque area between transparent slots 15 has a width of 22.5°. Thus, the position signals L1, L2 and L3 are symmetrical. The logically high portions thereof have the same duration as the logically low portions thereof.

It will also be understood that since the transparent slots 15 are spaced apart by 22.5° and the photosensors 18, 19 and 21 are spaced apart by 15°, the position signals L1, L2 and L3 will be displaced in phase relative to each other by 15°, which is the angle between the equally circumferentially spaced motor shaft step positions.

The photosensors 18, 19 and 21 are identical and function in the same manner. The disc 13 is rotated between the LEDs 32, 66 and 97 and the phototransistors 34, 68 and 99 so that the phototransistors 34, 68 and 99 are alternatively uncovered by the transparent slots 15 and covered by the opaque areas between the transparent slots 15. When, for example, the phototransistor 34 is uncovered by a transparent slot 15, the light from the LED 32 renders the phototransistor 34 conductive. In this manner, the phototransistor 34 is turned on and connects the +5 V source to the input of the operational amplifier 36. The operational amplifier 36 is connected as an inverting amplifier and produces a low output in response to a high input. This output is inverted by the inverter 44 to produce a high signal L1'.

When the phototransistor 34 is covered by an opaque area of the disc 13, the phototransistor 34 is turned off. The inverting input of the operational amplifier 36 goes low due to the connection to ground through the resistor 37 and the output of the operational amplifier 36 goes high. This high output is inverted by the inverter 44 to produce a low signal L1'. The signal L1' is of the same logical sense as the signal L1 but has a different magnitude. The operation is the same for the photosensors 19 and 21 and associated components.

The position signals L1, L2 and L3 are used for rotating the shaft 14 from a present position to a new selected step position through electrical energization of the motor 16. The position signals L1, L2 and L3 are also used to electrically hold the shaft 14 at any present step by energizing or exciting the motor 16 in a different manner. If the operator of the apparatus 11 wishes to manually rotate a platen (not shown) connected to the shaft 14, the apparatus 11 will provide an electrical hold or detent position at each shaft step position and will hold the shaft 14 at whichever step it is rotated to by the operator. This is accomplished by decoding the position signals L1, L2 and L3 to determine the present shaft step and energizing the appropriate windings 56, 89 and 119 to hold the shaft 14 in the present position. It will be understood that the shaft 14 is manually rotatable against the force of the motor 16.

Figure 4:
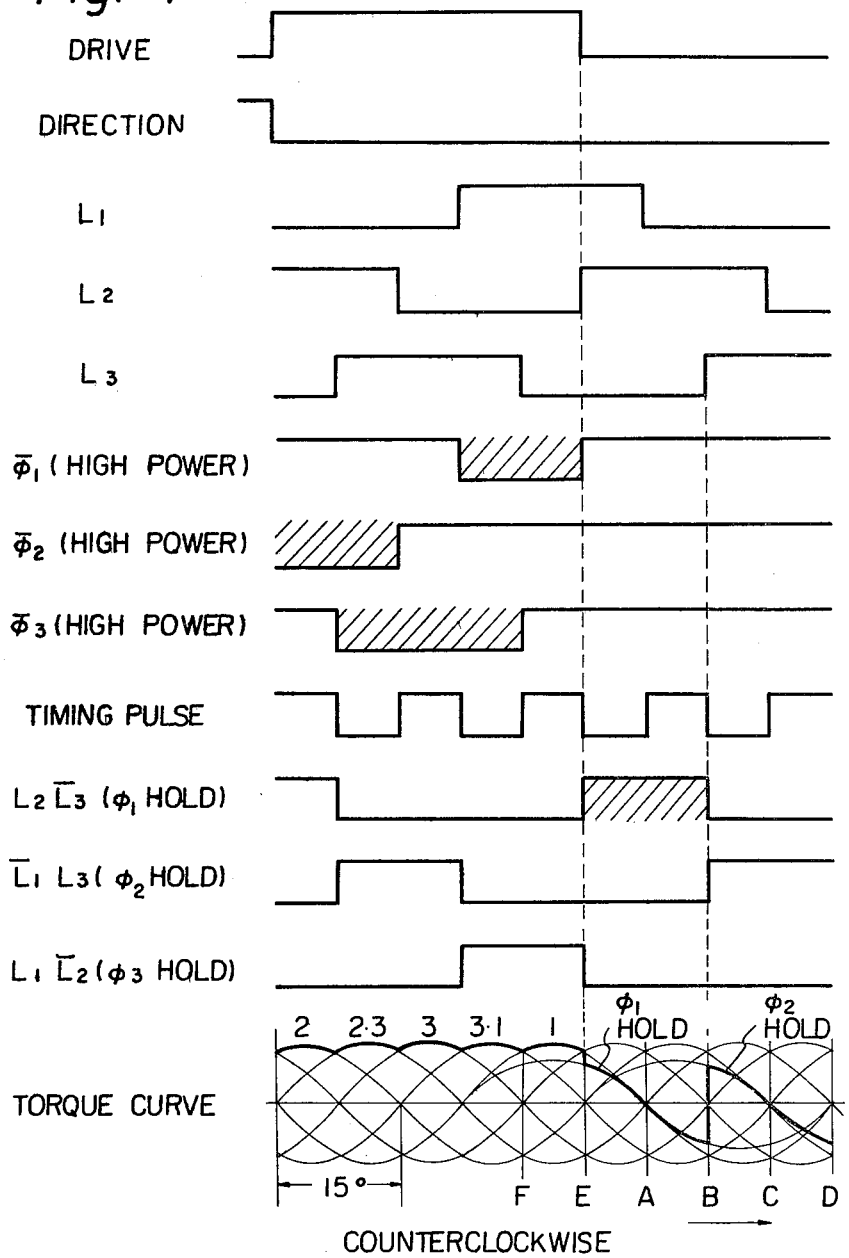
FIG. 4 is a timing diagram illustrating counterclockwise rotation of a motor shaft of the apparatus of FIGS. 2 and 3.

FIG. 4 illustrates the operation of the apparatus 11 for counterclockwise rotation. The direction signal is low and is applied to the exclusive OR gate 46, 79 and 111. This causes the exclusive OR gates 46, 79 and 111 to function as non-inverting buffers and pass the outputs of the inverters 44, 78 and 109 therethrough unaltered. The drive signal is made high in order to rotate the shaft 14. The high drive signal enables the NAND gates 47, 81 and 112 and thereby enables the high power drive unit 29 through the switch unit 24. The inverted drive signal inhibits the NAND gates 61, 92 and 122 and thereby the hold decoder unit 26.

Although the step control unit 22 is not illustrated in detail, it comprises a counter which is set to the number of steps through which it is desired to rotate the shaft 14. Each time the shaft 14 rotates by one step, the unit 28 generates a timing pulse which is fed to the unit 22 to decrement the counter. When the shaft 14 reaches the desired step and the counter is decremented to zero, the unit 22 makes the drive signal low to stop the rotation of the shaft 14 and enable the hold decoder unit 26 as will be understood from further description.

Referring now to FIG. 4 which illustrates counterclockwise rotation, at the time the drive signal is made high the motor shaft 14 is held in position by energizing the phase 1 winding 56 of the motor 16. Prior to making the drive signal high, the low drive signal enables the NAND gates 61, 92 and 122. Since the signals L1', L2° and L3' have the same logical sense, the following description will refer only to the signals L1, L2 and L3. The signal L2 is high and the signal L3 is low (the inversion L̄3 of the signal L3 is high). Thus, the NAND gate 61 produces a low output which energizes the winding 56 through the NOR gate 62, diode 63 and resistor 64. Any movement of the shaft 14 from the equilibrium position results in the generation of forward or reverse torque in the motor 16 which urges the shaft 14 back toward the equilibrium position. The outputs of the NAND gates 92 and 122 are high so that the windings 89 and 119 are not energized.

When the drive signal goes high the NAND gate 61 is inhibited and produces a high output, thereby having no effect on the winding 56. The position signal L2 is high and causes the NAND gate 81 to produce a low output. The outputs of the NAND gates 47 and 112 are high and have no effect on the motor 16. The low output of the NAND gate 81 turns on the transistor 83 which causes the transistors 87 and 88 to be turned on. This causes the phase 2 winding 89 of the motor 16 to be energized through the transistor 88. It will be noted that the winding 89 is connected between the −15 V and +15 V supplies by this operation and is energized with higher power than if connected to ground through the NOR gate 93 which occurs during a holding operation. Thus, the motor 16 is energized with higher power for rotating the shaft 14 than for holding the shaft 14 in position after rotation is stopped.

Energization of phase 2 of the motor 16 causes the shaft 14 to rotate counterclockwise toward the next step. After the shaft 14 has rotated 7.5° the position signal L3 goes high in addition to the signal L2. This causes the output of the NAND gate 112 to go low and energize the phase 3 winding 119 of the motor 16. It will be noted that at this time both of the windings 89 and 119 are energized. This urges the shaft 14 to rotate even further counterclockwise.

After the shaft 14 has rotated by another 7.5° (total of one step) the signal L2 goes low and only the signal L3 is high. This causes the output of the NAND gate 81 to go high and de-energize the winding 89. Thus, only the phase 3 winding 119 is energized.

Rotation of the shaft 14 by another 7.5° causes the signal L1 to go high. The output of the NAND gate 47 goes low to energize the phase 1 winding 56 in addition to the phase 3 winding 119. These actions cause the shaft 14 to rotate toward a progressively more counterclockwise equilibrium position.

Further 7.5° rotation of the shaft 14 causes the signal L3 to go low and inhibit the NAND gate 112, causing the phase 3 winding 119 to be de-energized. At this time only the phase 1 winding 56 is energized and the shaft 14 is moving toward a new selected step position A at which the shaft 14 will be held with the phase 1 winding 56 energized.

When the shaft 14 reaches a position E which is 7.5° clockwise from the position A the unit 22 causes the drive signal to go low. This inhibits the high power drive unit 29 by inhibiting the NAND gate 47, 81 and 112. The high output of the inverter 59 enables the NAND gate 61, 92 and 122.

At the positin E where the drive signal is made low, the signals L1 and L2 are high and the signal L3 is low. Thus, the output of the NAND gate 61 goes low to energize the phase 1 winding 56 of the motor 16 and hold the shaft 14 at the position A. It will be understood that in this exemplary case that the shaft 14 has rotated by 45° (3 steps) from one equilibrium position of the shaft 14 with the winding 56 energized to the adjacent counterclockwise equilibrium position thereof.

If the operator rotates the shaft 14 slightly counterclockwise from the position A, the motor 16 will exert a reverse torque on the shaft 14 urging the same clockwise back toward the position A. Conversely, if the shaft 14 is manually rotated clockwise the motor 16 will exert a forward torque on the shaft 14 urging the same counterclockwise back toward the position A. Thus, the shaft 14 is electrically held in a detent position.

Assuming, however, that the operator manually rotates the shaft 14 to the next counterclockwise position, designated as C, the signal L3 will go high at a position B which is 7.5° counterclockwise from the position A. Since L1 is low and L3 is high, the output of the NAND gate 61 will go high and the output of the NAND gate 92 will go low, thereby de-energizing the phase 1 winding 56 and energizing the phase 2 winding 89. This will cause the shaft 14 to be held at the position C which is an equilibrium position with the phase 2 winding 89 energized.

Conversely, if the operator rotates the shaft 14 clockwise past the position E, the signal L2 will go low. This will cause the output of the NAND gate 61 to go high, de-energizing the phase 1 winding 56. The output of the NAND gate 122 will go low, energizing the phase 3 winding 119. Thus, the shaft 14 will be held at a position F which is 15° (one step) clockwise of the position A.

With the direction signal low the exclusive OR gates 46, 79 and 111 function as non-inverting buffers and gate the signals from the inverters 44, 78 and 109 to the NAND gates 47, 81 and 122 without alteration. However, as will be described in detail below, the exclusive OR gates 46, 79 and 111 function as inverters when the direction signal is high for clockwise rotation.

As can be discerned from examination of the inputs of the NAND gates 61, 92 and 122, the holding conditions of the motor phases of the apparatus 11 are as follows.

L2·$\overline{L3}$ = Hold phase 1
$\overline{L1}$·L3 = Hold phase 2
L1·$\overline{L2}$ = Hold phase 3

These conditions are unique and are not influenced by whether the shaft was rotated to a particular step position in the clockwise or counterclockwise direction. This is because the drive signal does not have any effect when the high power drive unit 29 is inhibited and the hold drive unit 31 is enabled. The logical conventions above will be understood by taking for example the position C in FIG. 4 in which the signal L1 is low, the signal L2 is at the transition between high and low and the signal L3 is low. The signals L1 and L3 do not change in the range between the positions B and D. Since L1 is low, $\overline{L1}$ is high. This condition in combination with the high signal L3 causes the output of the NAND gate 92 to go low and energize the phase 2 winding 89 to hold the motor shaft 14 in the stable phase 2 energized position C.

Figure 5:
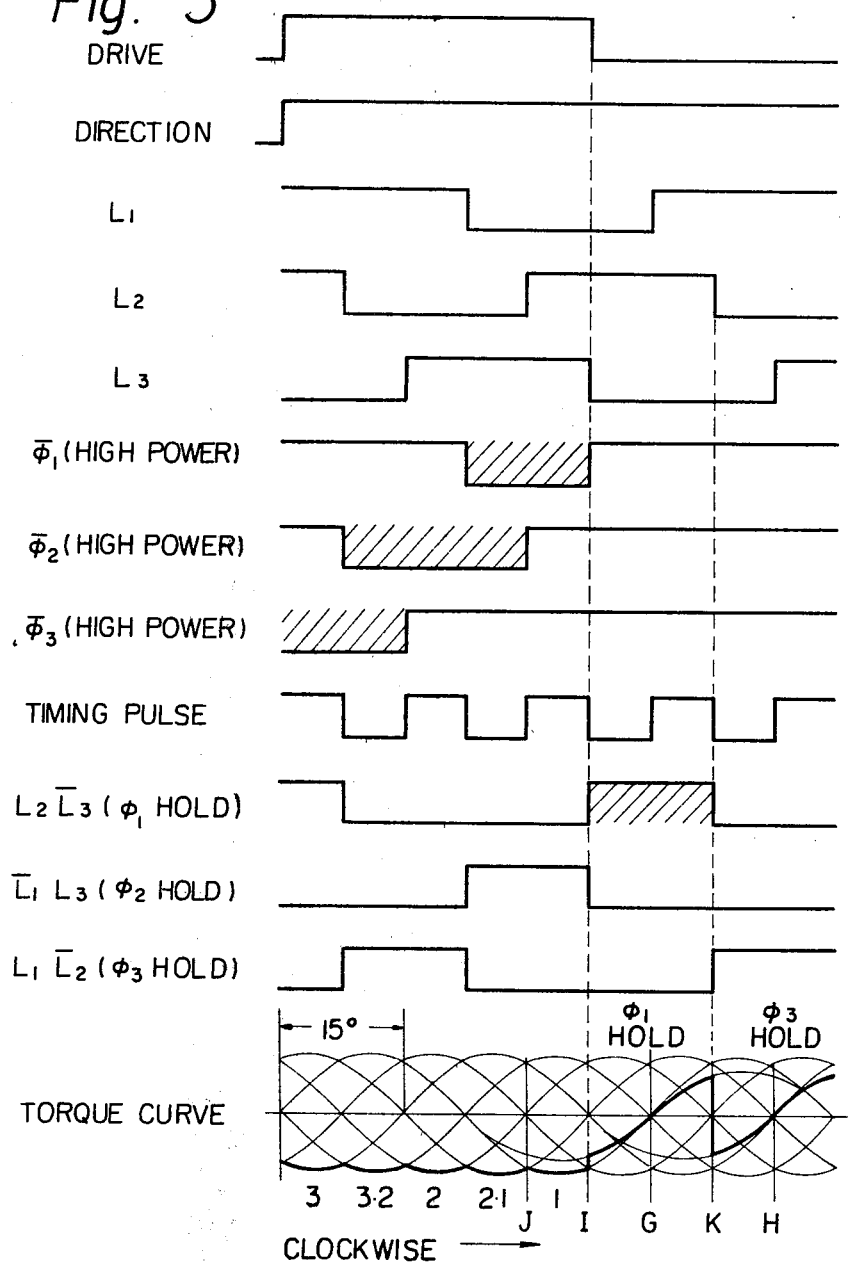
FIG. 5 is similar to FIG. 4 but illustrates clockwise rotation.

The operation for clockwise rotation is illustrated in FIG. 5. The starting step position will be assumed to be the same as in FIG. 4. The direction signal is high causing the exclusive OR gates 46, 79 and 111 to invert the signals L1′, L2′ and L3′. The inverted position signal $\overline{L3}$ is high and causes the NAND gate 112 to produce a low output. The outputs of the NAND gates 47 and 81 are high and have no effect on the motor 16. The low output of the NAND gate 112 turns on the transistor 114 which causes the transistors 117 and 118 to be turned on. This causes the phase 3 winding 119 of the motor 16 to be energized through the transistor 118.

Energization of phase 3 of the motor 16 causes the shaft 14 to rotate clockwise toward the next step. After the shaft 14 has rotated 7.5° the inverted position signal $\overline{L2}$ goes high in addition to the signal $\overline{L3}$. This causes the output of the NAND gate 92 to go low and energize the phase 2 winding 89 of the motor 16. It will be noted that at this time both of the windings 89 and 119 are energized. This urges the shaft 14 to rotate even further clockwise.

After the shaft 14 has rotated by another 7.5° (total of one step) the signal $\overline{L3}$ goes low and only the signal $\overline{L2}$ is high. This causes the output of the NAND gate 112 to go high and de-energize the winding 119. Thus, only the phase 2 winding 89 is energized.

Rotation of the shaft 14 by another 7.5° causes the signal $\overline{L1}$ to go high. The output of the NAND gate 47 goes low to energize the phase 1 winding 56 in addition to the phase 2 winding 89. These actions causes the shaft 14 to rotate toward a progressively more clockwise equilibrium position.

Further 7.5° rotation of the shaft 14 causes the signal $\overline{L2}$ to go low and inhibit the NANG gate 92, causing the phase 2 winding 89 to be de-energized. At this time only the phase 1 winding 56 is energized and the shaft 14 is moving toward a new selected step position G at which the shaft 14 will be held with the phase 1 winding 56 energized.

When the shaft 14 reaches a position I which is 7.5° counterclockwise from the position G the unit 22 causes the drive signal to go low. This inhibits the high power drive unit 29 by inhibiting the NAND gates 47, 81 and 112. The high output of the inverter 59 enables the NAND gates 61, 92 and 122.

At the position I where the drive signal is made low, the signal $\overline{L1}$ and $\overline{L3}$ are high and the signal $\overline{L2}$ is low. Thus, the output of the NAND gate 61 goes low to energize the phase 1 winding 56 of the motor 16 and hold the shaft 14 at the position G. It will be understood that in this exemplary case that the shaft 14 has rotated by 45° (3 steps) from one equilibrium position of the shaft 14 with the winding 56 energized to the adjacent clockwise equilibrium position thereof.

If the operator rotates the shaft 14 slightly counterclockwise from the position G the motor 16 will exert a reverse torque on the shaft 14 urging the same clockwise back toward the position G. Conversely, if the shaft 14 is manually rotated clockwise the motor 16 will exert a forward torque on the shaft 14 urging the same counterclockwise back toward the position G. Thus, the shaft 14 is electrically held in a detent position.

Assuming, however, that the operator manually rotates the shaft 14 to the next counterclockwise position, designated as J, the signal L3 will go high at the position I which is 7.5° counterclockwise from the position G. Since L1 is low and L3 is high, the output of the NAND gate 61 will go high and the output of the NAND gate 92 will go low, thereby de-energizing the phase 1 winding 56 and energizing the phase 2 winding 89. This will cause the shaft 14 to be held at the position J which is an equilibrium position with the phase 2 winding 89 energized.

Conversely, if the operator rotates the shaft 14 clockwise past a position K, the signal L2 will go low. This will cause the output of the NAND gate 61 to go high, de-energizing the phase 1 winding 56. The output of the NAND gate 122 will go low, energizing the phase 3 winding 119. Thus, the shaft 14 will be held at a position H which is 15° (one step) clockwise of the position G.

Figure 6:
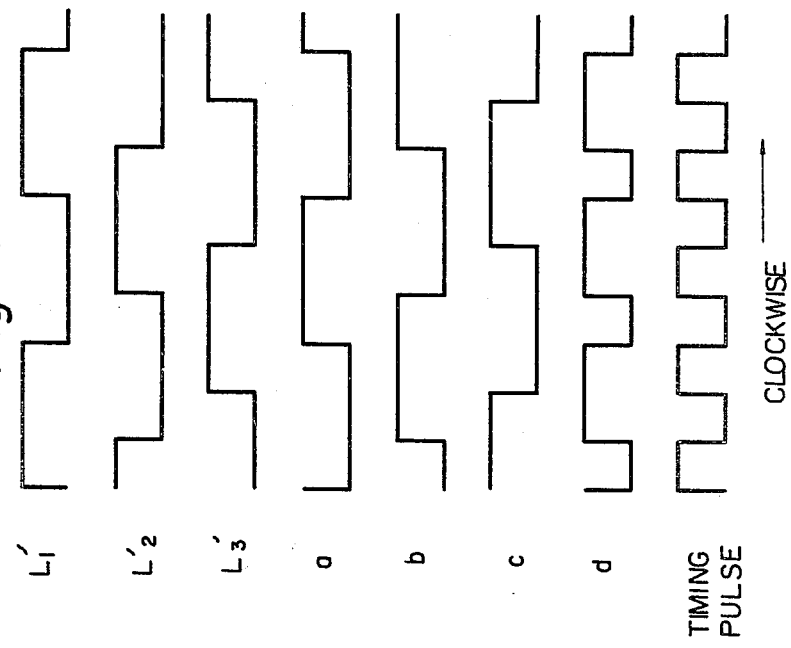
FIG. 6 is a timing diagram illustrating generation of timing pulses during counterclockwise rotation.

FIG. 6 illustrates how the timing pulses are generated by the unit 28. The counter in the unit 22 is decremented by the trailing (falling) edges of the timing pulses. As shown in FIGS. 4 and 5 the drive signal is made low in response to the falling edge of a timing pulse which occurs 7.5° before the new step position.

For counterclockwise rotation the signals a, b and c are identical to the signals L1′, L2′ and L3′ and are logically equivalent to the signals L1, L2 and L3 since the direction signal is low.

At the time the drive signal is made high, the signal a is low, the signal b is high and the signal c is low. Since the signals a and b are different, the output of the exclusive OR gate 131 which constitutes the signal d is high. Since the signals c and d are different, the output of the exclusive OR gate 132 which constitutes the timing pulse is high.

After the shaft 14 has rotated by 7.5° the signal c goes high. As the two inputs of the exclusive OR gate 132 are now the same, the output thereof which constitutes the timing pulse goes low.

After another rotation of 7.5° the signal b goes low. Since the inputs of the exclusive OR gate 131 are now the same, the output thereof which constitutes the signal d goes low. Since the signals c and d are now different, the timing pulse goes high.

After another 7.5° rotation the signal a goes high causing the signal d to go high. Since the signals c and d are now the same the timing pulse goes low.

After another 7.5° of rotation the signal c goes low. Since the signals c and d are now different, the timing pulse goes high.

After another 7.5° of rotation the signal b goes high, causing the signal d to go low since the signals a and b are now the same. Since both the signals c and d are low, the timing pulse goes low.

After another 7.5° of rotation the signal a goes low. Since the signals a and b are now different the signal d goes high. Since the signals c and d are different the timing pulse goes high.

After another 7.5° of rotation the signal c goes high. Since the signals c and d are now the same the timing pulse goes low.

After another 7.5° of rotation the signal b goes low. Since the signals a and b are the same the signal d goes low. Since the signal c and d are different the timing pulse goes high.

After yet another rotation of 7.5° the signal a goes high. Since the signals a and b are now different the signal d goes high. Since the signals c and d are the same the timing pulse goes low.

Although not illustrated, this operation continues in essentially the same manner such that one timing pulse is generated for each counterclockwise 15° step of the shaft 14.

Figure 7:
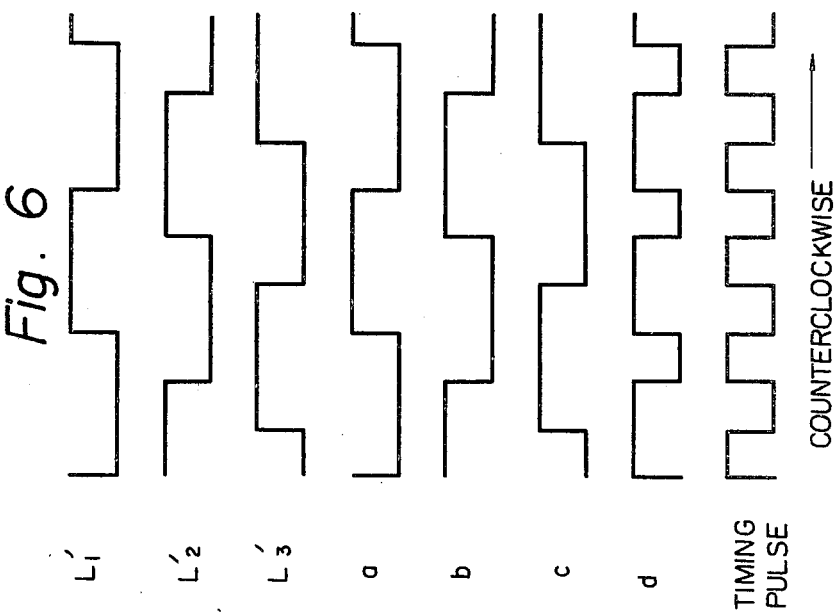
FIG. 7 is similar to FIG. 6 but illustrates clockwise rotation.

FIG. 7 illustrates the generation of timing pulses for clockwise rotation.

For clockwise rotation the signals a, b and c are inversions of the signals L1', L2' and L3' and are logical inversions the signals L1, L2 and L3 since the direction signal is high.

At the time the drive signal is made high, the signal a is low, the signal b is low and the signal c is high. Since the signals a and b are the same, the output of the exclusive OR gate 131 which constitutes the signal d is low. Since the signals c and d are different, the output of the exclusive OR gate 132 which constitutes the timing pulse is high.

After the shaft 14 has rotated by 7.5° the signal b goes high. As the two inputs to the exclusive OR gate 132 are now the same, the output thereof which constitutes the timing pulse goes low.

After another rotation of 7.5° the signal c goes low. Since the inputs of the exclusive OR gate 131 are still different, the output thereof which constitutes the signal d remains high. Since the signals c and d are now different, the timing pulse goes high.

After another 7.5° rotation the signal a goes high causing the signal d to go low. Since the signals c and d are now the same the timing pulse goes low.

After another 7.5° of rotation the signal b goes low. Since the signals c and d are now the same, the timing pulse goes high.

After another 7.5° of rotation the signal c goes high, causing the signal d to remain high since the signals a and b are still different. Since both the signals c and d are high, the timing pulse goes low.

After another 7.5° of rotation the signal a goes low. Since the signals a and b are now the same the signal d goes low. Since the signals c and d are now different the timing pulse goes high.

After another 7.5° of rotation the signal b goes high. Since the signals c and d are now the same the timing pulse goes low.

After another 7.5° of rotation the signal c goes low. Since the signals a and b are still different the signal d remains high. Since the signals c and c are different the timing pulse goes high.

After yet another rotation of 7.5° the signal a goes high. Since the signals a and b are now the same the signal d goes low. Since the signals c and d are the same the timing pulse goes low.

Although now illustrated, this operation continues in essentially the same manner such that one timing pulse is generated for each clockwise 15° step of the shaft 14.

Figure 8:
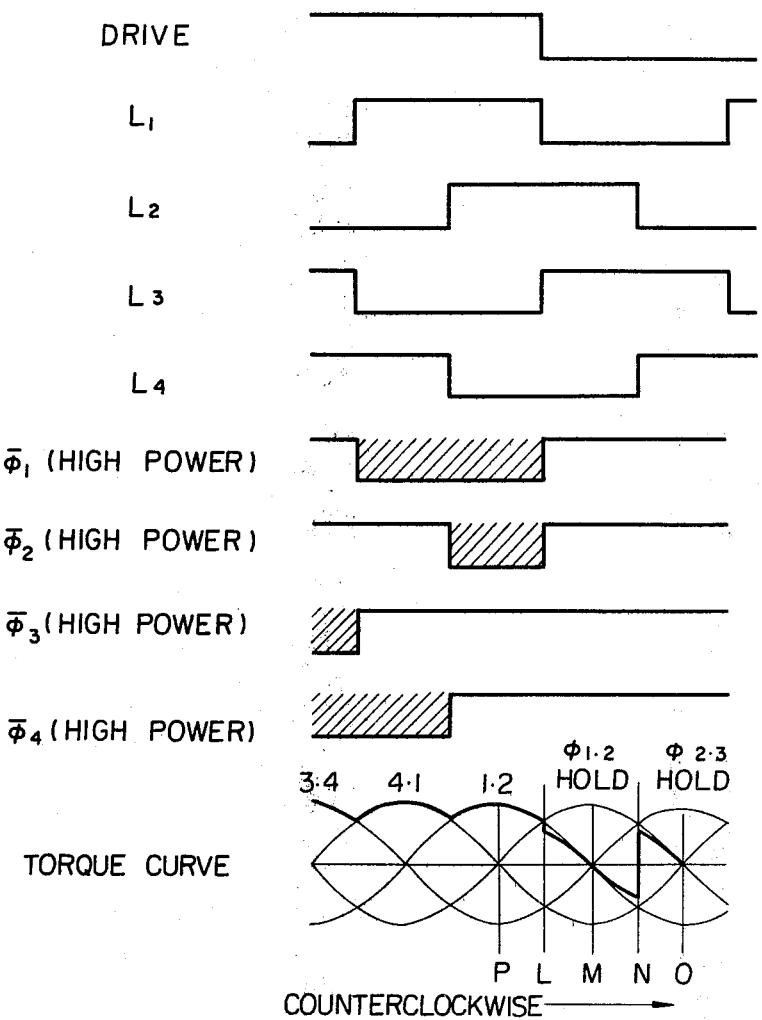
FIG. 8 is a timing diagram illustrating two phase excitation of a four phase stepping motor for counterclockwise rotation.

FIG. 8 illustrates an example of a system in which a four phase motor is energized in such a manner that two phases are energized at a time. Although the sensor means for generating the position signals is not illustrated, it comprises four photosensors, one for each motor phase, which are spaced from each other by an angular distance equal to the angle between adjacent motor shaft steps. The position signals are designated as L1, L2, L3 and L4.

As in the embodiment described hereinabove, the phases which are energized for rotating the shaft 14 correspond to the signals L1, L2, L3 and L4 which are logically high. The shaft 14 is assumed to be in an equlibrium position which phases 2 and 3 energized for holding the shaft 14. The holding conditions are as follows.

L2·L3 = Hold phases 1 and 2
L3·L4 = Hold phases 2 and 3
L4·L1 = Hold phases 3 and 4
L1·L2 = Hold phases 4 and 1

For rotating the shaft 14 phases 3 and 4 are initially energized since the signals L3 and L4 are high. After rotation of one half step the signal L3 goes low and the signal L1 goes high to energize phases 4 and 1. After rotation of one more step the signal L2 goes high and the signal L4 goes low to energize phases 1 and 2. After rotation of one more step the signal L1 goes low and the signal L3 goes high to energize phases 2 and 3.

At this time, however, as indicated at L, the drive signal is made low to stop the shaft 14 and switch the operation from drive to hold. The signals L2 and L3 are high so tht the phases 2 and 3 are not energized by the drive means, which is inibited in response to the low drive signal, but the phases 1 and 2 are maintained energized by the hold means. This is in conformance with the holding conditions above. Thus, the shaft 14 is rotated to and held at a position M with phases 1 and 2 energized.

If the shaft 14 is manually rotated counterclockwise by more than one half step past a position N, the signals L3 and L4 will be high to energize phases 2 and 3 and hold the shaft 14 at a position O which is one step counterclockwise from the position M. If, conversely, the shaft 14 is manually rotated clockwise by more than one half the step past a position L, the signals L1 and L2 will be high to energize phases 4 and 1 and hold the shaft 14 at a position P which is one step clockwise of the position M. The result of the operation illustrated in FIG. 8 is to rotate the shaft 14 counterclockwise by three steps and hold it in the new position.

Figure 9:
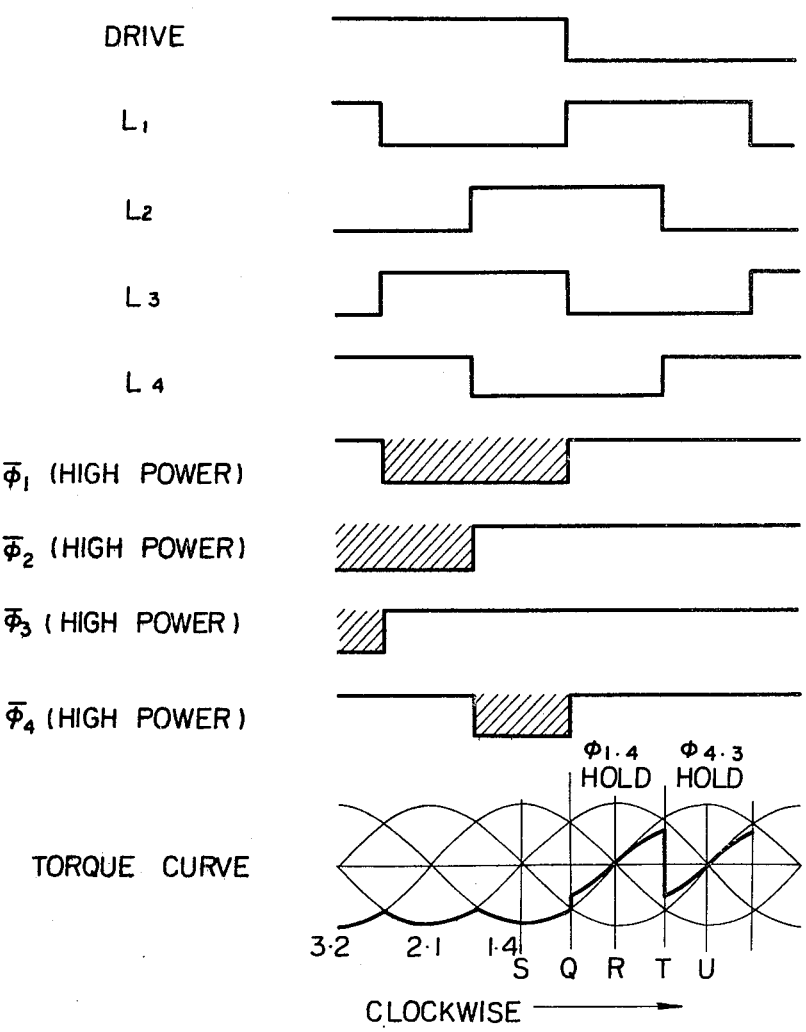
FIG. 9 is similar to FIG. 8 but illustrates clockwise rotation.

FIG. 9 illustrates clockwise rotation from a position in which phases 4 and 3 are energized for holding. Since the drive signal is high the signals L1, L2, L3 and L4 are inverted by exclusive OR gates corresponding in function to the exclusive OR gates (not shown). The phases which are energized for rotating the shaft 14 correspond to the signals L1, L2, L3 and L4 which are logically low. The shaft 14 is assumed to be in an equilibrium position with phases 3 and 4 energized for holding the shaft 14. The holding conditions may be rewritten follows.

$\overline{L4}\cdot\overline{L1}$ = Hold phases 1 and 2
$\overline{L1}\cdot\overline{L2}$ = Hold phases 2 and 3
$\overline{L2}\cdot\overline{L3}$ = Hold phases 3 and 4
$\overline{L3}\cdot\overline{L4}$ = Hold phases 4 and 1

For rotating the shaft 14 phases 2 and 3 are initially energized since the signals L1 and L4 are high. After rotation of one half step the signal L1 goes low and the signal L3 goes high to energize phases 1 and 2. After rotation of one more step the signal L2 goes high and the signal L4 goes low to energize phases 1 and 4. After rotation of one more step the signal L3 goes low and the signal L1 goes high to energize phases 3 and 4.

At this time, however, as indicated at Q, the drive signal is made low to stop the shaft 14 and switch the operation from drive to hold. The signals L1 and L2 are high so that the phases 3 and 4 are not energized by the drive means, which is inhibited in response to the low drive signal, but the phases 1 and 4 are maintained energized by the hold means. This is in conformance with the holding conditions above. Thus, the shaft 14 is rotated to and held at a position R with phases 1 and 4 energized.

If the shaft 14 is manually rotated counterclockwise by more than one half step past the position Q, the signals L2 and L3 will be high to energize phases 1 and 2 and hold the shaft 14 at a position S which is one step counterclockwise from the position R. If, conversely, the shaft 14 is manually rotated clockwise by more than one half step past a position T, the signals L1 and L4 will be high to energize phases 4 and 3 and hold the shaft 14 at a position U which is one step clockwise of the position R. The result of the operation illustrated in FIG. 8 is to rotate the shaft 14 clockwise by three steps and hold it in the new position.

Figure 10:
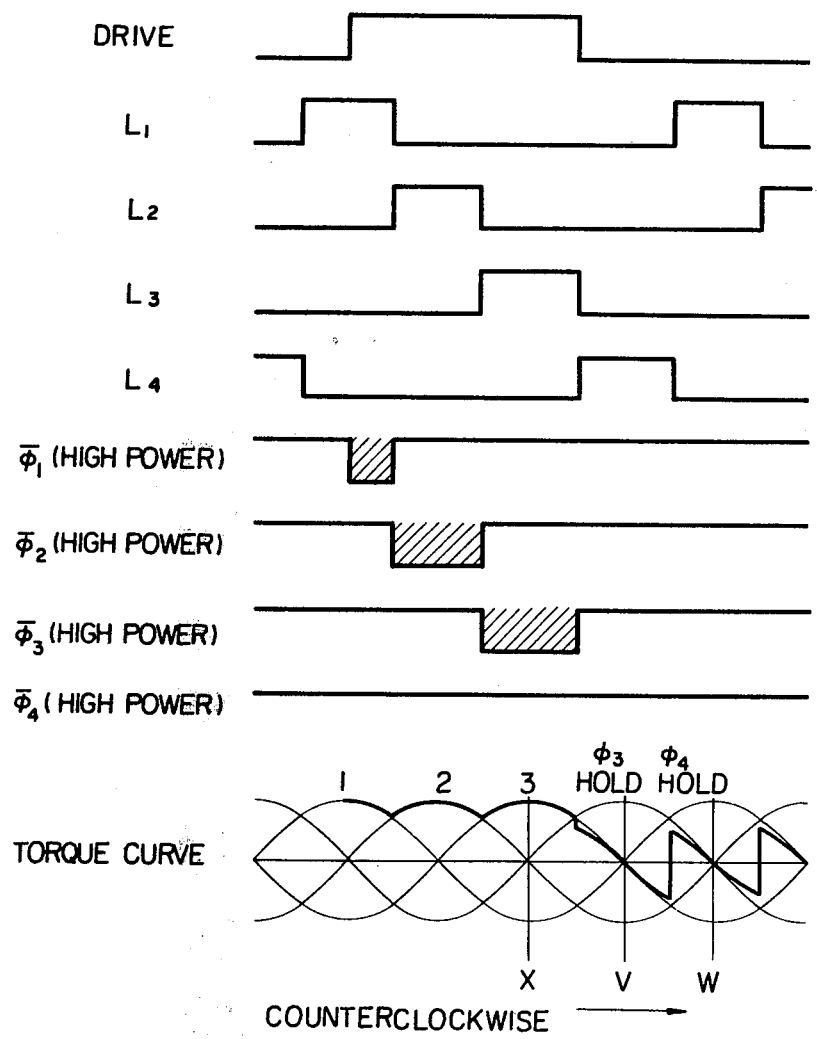
FIG. 10 is a timing diagram illustrating one phase excitation of a four phase stepping motor for counterclockwise rotation.

FIG. 10 illustrates another arrangement in accordance with the present invention in which a four phase motor is energized one phase at a time. The sensor means comprises four photosensors which are spaced from each other by an angle equal to the angular distance between shaft steps and generate position signals L1, L2, L3 and L4. Due to the simplified arrangement only counterclockwise rotation is illustrated.

The motor phases which are energized correspond to the logically high position signals. The holding conditions are as follows.

L4 = Hold phase 3
L1 = Hold phase 4
L2 = Hold phase 1
L3 = Hold phase 2

Initially, the signal L1 is high and phase 4 is energized for holding the shaft 14. When the drive signal is made high the drive means is enabled and phase 1 energized for driving the shaft 14. After the shaft 14 has rotated by one half step the signal L1 goes low and the signal L2 goes high. This causes phase 2 to be energized.

After rotation of one more step the signal L2 goes low and the signal L3 goes high to energize phase 3.

After rotation of one more step the signal L3 goes low and the signal L4 goes high. However, since the drive signal is made low at this time the drive means does not energize phase 4 but instead the hold means energizes phase 3 to hold the shaft 14 at a position V.

If the shaft 14 is moved counterclockwise by one step from the position V to a position W, the signal L1 will go high to energize phase 4 and hold the shaft in the position W. If the shaft 14 is moved clockwise from the position V by one step to a position X, the signal L3 will go high to energize phase 2 and hold the shaft 14 in the position X.

In summary, it will be seen that the present invention provides an improved stepping motor apparatus comprising an electric detent means which allows the operator to rotate the motor shaft and connected load to a larger number of stable detent positions than has been possible in the prior art. Various modifications will become possible for those skilled in the art after receiving the teachings of the present disclosure without departing from the scope thereof. For example, the timing pulse generator unit 28 may be replaced by a sensor means which generates separate timing pulses rather than deriving the timing pulses from the position pulses.

What is claimed is:

1. A stepping motor apparatus including a multiphase motor having a shaft and drive means for individually energizing the motor phases to rotate the shaft to a selected one of a predetermined number of equally spaced angular steps, characterized by comprising:

sensor means driven by the motor shaft for generating a plurality of position signals equal in number to a number of the motor phases, the position signals being displaced in phase from each other by an angle between two adjacent steps of the shaft;

hold decoder means; and control means for de-energizing the hold decoder means to enable the drive means to rotate the shaft to the selected step and energizing the hold decoder means when the shaft reaches the selected step, the holder decoder means decoding the position signals and controlling the drive means to energize at least one of the motor phases in such a manner as to hold the shaft at the selected step, the hold decoder means enabling the shaft to be manually rotated from the selected step by any other step and controlling the drive means to hold the shaft at said any other step.

2. An apparatus as in claim 1, further comprising drive decoder means for decoding the position signals and controlling the drive means to energize at least one of the motor phases in such a manner as to rotate the shaft to a next step and switch means for selectively connecting the drive decoder means and the hold decoder means to the drive means.

3. An apparatus as in claim 1, in which the drive decoder means and the hold decoder means each comprise gate means.

4. An apparatus as in claim 2, further comprising command signal generator means for generating and feeding a drive signal to the switch means.

5. An apparatus as in claim 4, in which the drive decoder means and drive means are constructed to selectively rotate the shaft in either direction, the command signal generator means being further constructed to generate and feed a direction signal to the drive decoder means.

6. An apparatus as in claim 5, in which the drive decoder means comprises a plurality of exclusive OR gates each having an input connected to receive the direction signal and another input connected to receive a respective position signal.

7. An apparatus as in clam 1, further comprising pulse gnerator means for receiving the position signals from the sensor means and generating pulses in response thereto, each pulse corresponding to rotation of the shaft by one step.

8. An apparatus as in claim 1, in which the position signals are symmetrical.

9. An apparatus as in claim 1, in which the sensor means comprises a photoelectric transducer.

* * * * *